Sept. 30, 1924.  M. B. A. DORING  1,510,390
BRAKE
Filed Aug. 28, 1923

INVENTOR.
Max B. A. Doring
BY
Leo J. Matty
ATTORNEY.

Patented Sept. 30, 1924.

1,510,390

UNITED STATES PATENT OFFICE.

MAX B. A. DORING, OF BROOKLYN, NEW YORK, ASSIGNOR TO DORING COMPANY, INC., OF NEW YORK, N. Y., A CORPORATION OF NEW YORK.

BRAKE.

Application filed August 28, 1923. Serial No. 659,736.

*To all whom it may concern:*

Be it known that I, MAX B. A. DORING, a citizen of the German Republic, but have declared my intention to become a citizen of the United States of America, and a resident of Brooklyn, in the county of Kings and State of New York, have invented certain new and useful Improvements in Brakes, of which the following is a specification.

This invention relates to a braking device and the objects of the invention are to provide a brake in which the braking means are made with gears. Further objects of the invention are to provide a brake that is simple in construction and easily operated, more particularly for use on automobiles.

To the accomplishment of the above objects and to such others as may hereinafter appear the invention comprises a plurality of gears in mesh with each other with means for tightly meshing said gears to obtain a braking effect in relation to each other.

Referring to the drawings:—

Figure 1:
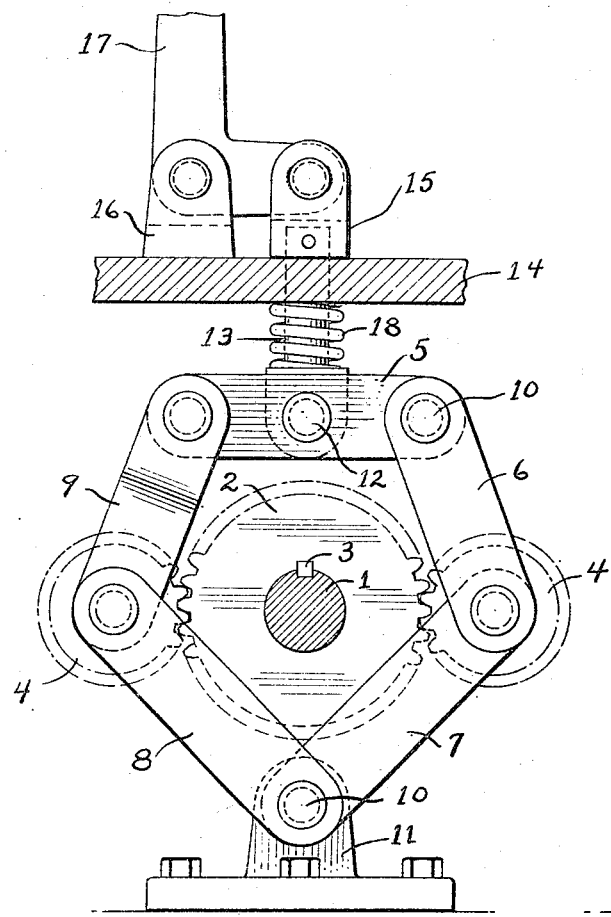
Figure 1 is a side view partly in section of a brake made in accordance with the present invention.
Figure 2:
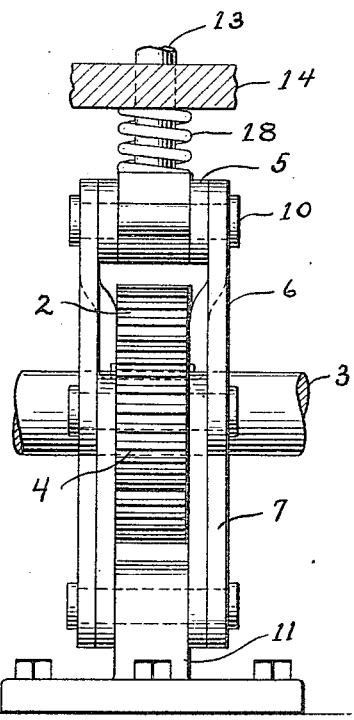
Figure 2 is an end view of Fig. 1 with the brake lever removed.

In the drawings 1 designates a rotating shaft or member, for example, one of the axles of an automobile, although the improved braking means is equally applicable to any rotary member to which it is desired to apply braking means. A brake gear 2 in the present instance a spur gear suitably keyed to the shaft 1 by means of a key 3 is provided which is arranged to mesh with two similar auxiliary brake gears 4.

In the present instance the auxiliary brake gears 4 are movably supported opposite each other by means of a series of links 5, 6, 7, 8 and 9 which are connected by means of suitable pivot pins 10.

One end of the links 7 and 8 are pivoted to a base plate 11 which has a fixed position in relation to the shaft 1. The links 5 have pivotally connected near their center, by means of a pivot pin 12, one end of a rod 13 the upper end of which projects through a floor plate 14 and is secured to a bearing block 15, said floor plate 14 having a fixed position in relation to the shaft 1.

Suitably supported on the floor plate 14 is a bearing block 16 to which is pivoted the elbow portion of a brake lever 17, one end of which is loosely pivoted to the bearing block 15.

The brake lever 17, rod 13 and connecting links hold the auxiliary brake gears 4, through the medium of a coiled spring 18 on the rod 13, in neutral or normal loose running position in mesh with the brake gear 2.

In the present instance the brake is applied by moving the brake lever 17 slightly to the left which acts to draw the rod 13 upward against the action of the spring 18, and with it the links 5, 6, 7, 8 and 9 to thereby force the auxiliary brake gears 4 into braking relation with the brake gear 2. The brake is released by moving the brake lever 17 to the right which acts to push the rod 13 downward, assisted by the action of the spring 18 and with it the links 5, 6, 7, 8 and 9 to thereby release the auxiliary brake gears 4 from braking relation with the brake gear 2.

Due to the fact that the links 5 are pivoted near their center to the rod 13 the links 5 act as an equalizing bar to equalize the braking effect of the auxiliary brake gears 4.

In the present instance the brake gear 2 and auxiliary brake gears 4 are provided with spur teeth but the device will work equally well with herring-bone teeth for example, which have an additional advantage in that three teeth are in engagement at the same time to give smoother running action and greater braking effect.

It is also to be noted that only two auxiliary brake gears 4 are used in the present instance but more can be used if a greater braking effect is desired; for example, an additional auxiliary brake gear 4 can be connected to the lower ends of the levers 7 and 8 and the base plate 11 omitted.

While the invention has been described with particular reference to the details of construction, the same is not to be considered as limited thereto, as many changes can be made and still fall within the scope of the invention set forth in the following claims.

What I claim is:—

1. A braking device comprising in combination a rotating member, a brake gear secured to said member, a plurality of oppositely disposed auxiliary brake gears arranged to mesh with said brake gear, and means for tightly meshing said gears to brake said member, the braking action of said gears being at an angle to the direction of movement of said gears.

2. A braking device comprising in combination a rotating member, a brake gear secured to said member, a plurality of auxiliary brake gears arranged to mesh with said brake gear, links for supporting said auxiliary brake gears, and means for tightly meshing said gears to brake said member, the braking action of said gears being at an angle to the direction of movement of said gears.

3. A braking device comprising in combination a rotating member, a brake gear secured to said member, a plurality of auxiliary brake gears arranged to mesh with said brake gear, links for supporting said auxiliary brake gears, means for tightly meshing said gears to brake said member, and an equalizing bar connected to said links for equalizing the braking action of said auxiliary gears, the braking action of said gears being at an angle to the direction of movement of said gears.

In testimony whereof I have signed this specification in the presence of two subscribing witnesses.

MAX B. A. DORING.

Witnesses:
LEO J. MATTY,
LILIAN E. POTTER.